United States Patent Office 3,325,627
Patented June 13, 1967

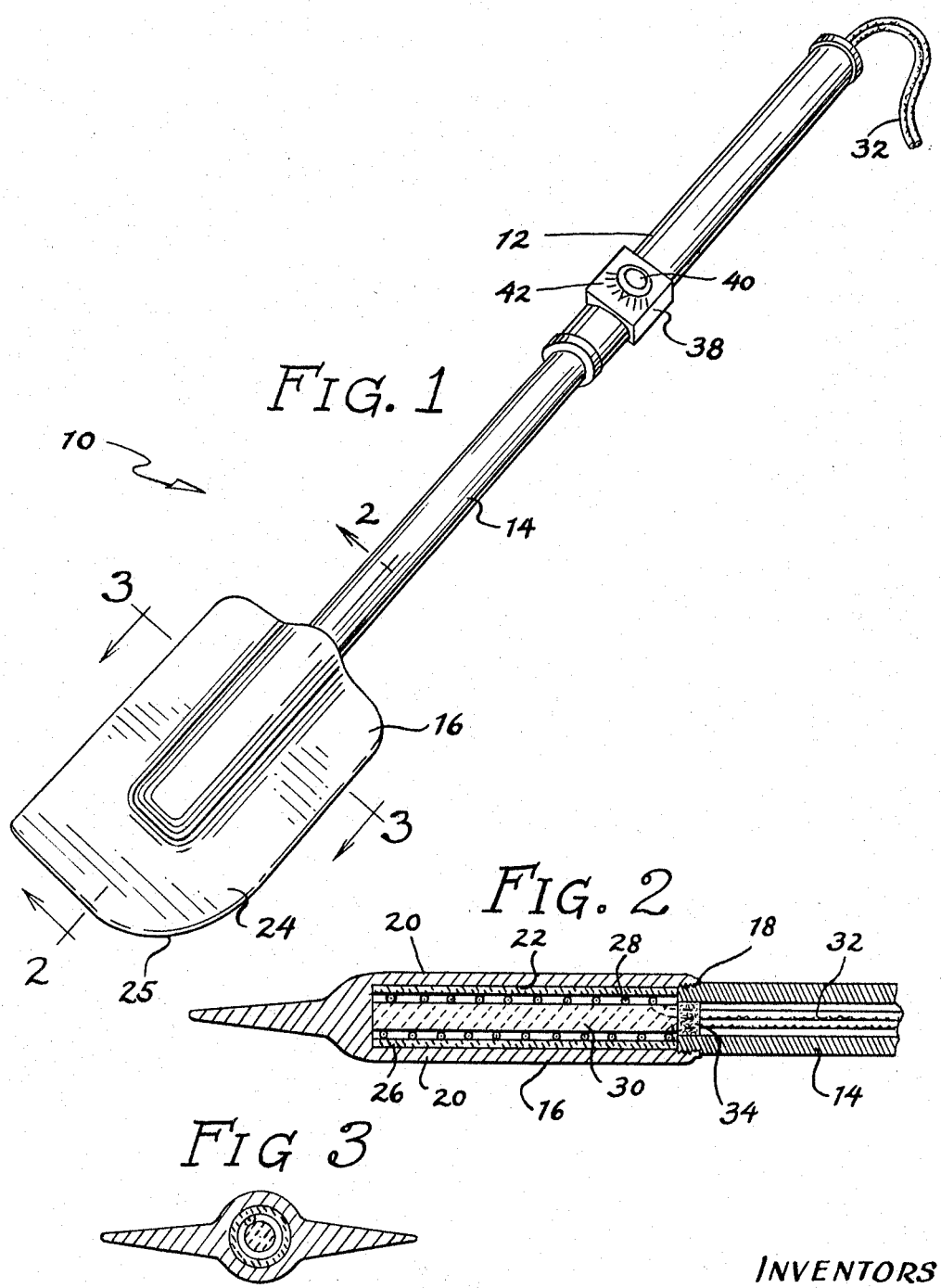

3,325,627
ELECTRICALLY HEATED MIXING SPATULA
Majory L. Adler, 300 N. State St., Chicago, Ill. 60610, and William J. Kenney, Villa Park, Ill.; said Kenney assignor to said Adler
Filed Sept. 30, 1964, Ser. No. 400,459
3 Claims. (Cl. 219—227)

This invention relates to a construction which incorporates heating elements and which can be employed for the mixing of foods and materials of like characteristics. In particular the mixing means is designed for simultaneous cooking of the food products whereby external heating can be eliminated.

The instant invention will be described with reference to a spatula construction containing heating elements, which is adapted to be employed for the cooking and mixing of food products. There have previously been disclosed constructions which employed heating elements whereby the handling of frozen food products could be facilitated. Reference is made to Cox Patent No. 1,323,-523, Kelly Patent No. 1,974,051 and Jacobson Patent No. 2,751,175 wherein disclosures are made of ice cream dippers of the type described.

The instant invention incorporates a completely new design for a heated utensil whereby certain advantages over prior art constructions can be realized. In particular, the instant invention embodies an improved means for incorporating heating elements into the construction whereby the construction can be easily assembled and can be manufactured at a relatively low cost. Certain aspects of this invention also involve the particular design of a spatula whereby heating elements can be readily incorporated therein.

Although heating elements have previously been incorporated in utensils, there have not been available utensils suitable for cooking and mixing purposes. It has surprisingly been found that heating elements can be incorporated into structures and that the resulting structures are suited for cooking and mixing. The provision of the heating elements greatly simplifies the cooking and mixing operations and, in this connection, it is believed that the heated mixing constructions provide for greater ease of mixing since the heat effects tend to provide more homogeneous mixes. The heat generated naturally provides the cooking results desired.

It is one important object of this invention to provide a heated cooking and mixing utensil construction which incorporates heating elements designed for easy assembly in the construction whereby unique advantages from the standpoint of manufacturing efficiency and cost can be realized.

It is a further object of this invention to provide a heated utensil of the type described which is particularly suitable for the mixing of food products in a highly simplified manner.

It is one particular object of this invention to provide a heated utensil construction which takes the form of a spatula and which is designed for maximum efficiency from the standpoint of manufacturing and use.

These and other objects of this invention will appear hereinafter and for purposes of illustration but not of limitation, specific embodiments of this invention are shown in the accompanying drawing in which:

FIGURE 1 is a perspective view of the preferred form of heated utensil of this invention;

FIGURE 2 is a fragmentary cross-sectional view taken about the line 2—2 of FIGURE 1; and, FIGURE 3 is a cross-sectional view taken about the line 3—3 of FIGURE 1.

The utensil of this invention includes a handle portion which is preferably formed of an insulating material whereby the utensil can be comfortably used. Materials of the type employed for forming handles on pans and the like are completely suitable for use as the handle portion of the utensil of this invention.

The handle portion is associated with a tubular extension which connects the handle portion with the working end of the tool. The tubular characteristics of the handle portion are important since the lead wires which provide the heating element in the working end of the utensil are adapted to extend through the tubular portion.

The working end portion of the tool can be threaded onto the tubular portion or otherwise attached thereto. In the preferred form of this invention, the working end portion takes the form of a spatula in that it is characterized by a generally flat configuration. The heating element is located between the opposed faces of the spatula, and these faces are heated whereby the outer surfaces thereof will contact the food being mixed. The flat design of the instrument facilitates penetration.

The accompanying drawing illustrates the preferred design of the instant invention including the unique means for associating a heating element with a utensil of the type contemplated. In these drawings, the heated utensil is represented by the spatula 10 of FIGURE 1. The spatula is comprised of a handle portion 12 formed of an insulating material for ease of handling. A tubular extension 14 extends between the handle and the working end portion or mixing paddle 16 of the spatula. Various means can be employed for connecting the illustrated members into the desired assembly. The tubular extension 14 can be press-fitted into the handle portion 12 or a threaded connection can be provided. Similarly, the opposite end of the extension 14 can be press-fitted into the working end 16 or threaded thereinto as shown at 18 in FIGURE 2.

The working end portion 16 comprises opposed faces 20 which are generally flat. In the central area of the end 16, there is provided an enlarged bore 22 which is employed for confining the heated elements. Surrounding this enlarged portion, the edge 24 of the working end is of a relatively narrow thickness and it tapers to a knife-like edge. A rounded corner 25 is designed to conform to the corner of a bowl.

Within the bore 22, there is provided a cylindrical ceramic sleeve 26. This sleeve fits snugly against the inner surfaces of the bore and, accordingly, the working end portion is electrically insulated from the heating element.

The heating element, shown at 28, comprises a spirally formed wire located around a central ceramic core 30. It will be noted that the leads 32 extend through the tubular member 14 for providing electrical connection for the wire 28. As shown in FIGURE 1, the leads 32 extend out through the end of the handle where they can be connected to a source of electrical energy. In this connection, conventional outlets are contemplated for use with the constructions of this invention; however, a battery source is also clearly suitable and such a source can be mounted directly on the unit.

The utensil described is provided with a thermostat 38 located in the handle 12. This thermostat may be of conventional design including an indicator knob 40 and temperature markings 42. In the preferred form of this invention, the heating elements are adapted to heat the construction to a temperature in the order of 500° F. whereby virtually all cooking conditions can be realized. It will be seen from FIG. 1 that the thermostat 38 is in the end of the handle 12 adjacent the inner end of the extension tube 14. Thus, it will be evident that the extension tube 14 carries heat to the thermostat from the heating element 28. Of course, the temperature at the thermostat 38 is lower than, but related to, the temperature of the working end portion 16. Those skilled in the art will understand that one of the electrical leads 32 is connected to the thermostat.

It will be appreciated that the various elements which form the heated utensil of this invention can be assembled in an extremely simple manner. The leads 32 can be readily threaded into the handle and extension portions 12 and 14, respectively. The heating wires 28 can then be wrapped around a core 30 to provide the desired spiral configuration. In this connection, a plug member 34 can be associated with the end of the tubular extension 14 and the core 30 can be supported by this plug member. Suitable openings are provided in the plug member for passage of the lead wires.

The cylindrical sleeve 26 can be inserted around the heating wires 28 and the entire assembly can then be passed into the large bore 22. After securing the portions 12, 14 and 16 together, the completed utensil is ready for use.

The construction of this invention is particularly suitable for the simultaneous cooking and mixing of foods such as gravies, puddings, fudge and similar products. In such cases, a double boiler is often required, and it is obvious that the instant construction eliminates the inconvenience of such an arrangement. Furthermore, the use of the arrangement of this invention eliminates certain other difficulties found to exist during cooking. In particular, scorching on the surface of a pan is eliminated since the arrangement of this invention does not produce any areas of extremely high heat. This is in contrast to cooking on a stove wherein the bottom surface of the pan is often heated to a much higher temperature than is desired for the cooking.

The design illustrated is also advantageous since the bore for receiving the heating elements can be readily formed in the spatula without in any way detracting from the operation of the unit. The flat surfaces provided by reason of the spatula configuration are extremely suitable for mixing food products.

Although the illustrated design is preferred, it will be understood that various other utensils can be constructed while utilizing the principles of this invention. Specifically, a design taking the shape of a fork or other beater member, but having the general configuration illustrated, is clearly feasible.

It will be understood that various changes and modifications may be made in the described subject matter which provide the characteristics of this invention without departing from the spirit thereof particularly as defined in the following claims.

That which is claimed is:

1. A utensil for the mixing of food products, said utensil comprising a hollow tubular handle portion formed of a heat insulating material, a hollow tubular extension having its inner end connected to said handle portion, a working end connected to the outer end of said tubular extension, said working end comprising a spatula blade having a cylindrically enlarged central portion with a bore therein, said tubular extension being mounted in said bore, said bore communicating with the hollow interior of said extension, a cylindrical ceramic core mounted in the outer end of said tubular extension and extending into said bore, a heating element comprising a wire wrapped around said core, a cylindrical ceramic sleeve interposed between said heating element and said bore for conducting heat to said working end while electrically insulating said working end from said heating element, said sleeve being closely received around said heating element and engaged with the interior of said working end within said bore, and electrical leads connected to said heating element and extending through the hollow interiors of said extension and said handle for supplying electrical energy to said heating element, said spatula blade having flat surfaces on the opposite sides thereof extending outwardly from said enlarged central portion and tapering to knife-like edges around the periphery of said spatula blade.

2. A utensil according to claim 1, including a thermostat mounted in said handle adjacent said inner end of said tubular extension and connected to one of said electrical leads for regulating the temperature produced by said heating element.

3. A utensil for the mixing of food products, said utensil comprising a hollow tubular handle portion formed of a heat insulating material, a hollow tubular extension having its inner end connected to said handle portion, a working end connected to the outer end of said tubular extension, said working end comprising a mixing paddle having a cylindrically enlarged central portion with a bore therein, said tubular extension being mounted in said bore, said bore communicating with the hollow interior of said extension, a cylindrical ceramic core mounted in the outer end of said tubular extension and extending into said bore, a heating element comprising a wire wrapped around said core, a cylindrical ceramic sleeve interposed between said heating element and said bore for conducting heat to said working end while electrically insulating said working end from said heating element, said sleeve being closely received around said heating element and engaged with the interior of said working end within said bore, and electrical leads connected to said heating element and extending through the hollow interiors of said extension and said handle for supplying electrical energy to said heating element.

References Cited

UNITED STATES PATENTS

| 1,228,180 | 5/1917 | Chandler | 219—228 |
| 1,905,987 | 4/1933 | Lane | 219—236 |
| 2,065,886 | 12/1936 | Clift | 15—245 |
| 2,214,084 | 9/1940 | Lovice | 219—237 X |
| 2,250,602 | 7/1941 | Pierce | 30—140 |
| 2,304,559 | 12/1942 | Engesser | 30—140 |
| 2,721,251 | 10/1955 | Thomas | 219—533 X |

FOREIGN PATENTS

| 349,279 | 2/1922 | Germany. |
| 813,288 | 9/1951 | Germany. |

ANTHONY BARTIS, *Primary Examiner.*